United States Patent [19]

Hasenfratz

[11] 4,188,938

[45] Feb. 19, 1980

[54] BURNER DEVICE, ESPECIALLY FOR A BRAZIER OR THE LIKE

[75] Inventor: Rene Hasenfratz, Eschlikon, Switzerland

[73] Assignee: Gebr. Spring, Metallwarenfabrik G.m.b.H., Eschlikon, Switzerland

[21] Appl. No.: 880,124

[22] Filed: Feb. 22, 1978

[30] Foreign Application Priority Data

Feb. 22, 1977 [CH] Switzerland ............... 2199/77

[51] Int. Cl.² ............................................. F24C 5/00
[52] U.S. Cl. ..................................................... 126/43
[58] Field of Search ............ 126/25 R, 25 A, 25 AA, 126/25 C, 25 B, 26, 40, 50, 51, 214 C, 220, 43, 48; 431/144, 146

[56] References Cited

U.S. PATENT DOCUMENTS

| 1,836,889 | 12/1931 | Wygodsky | 126/43 |
| 2,356,788 | 8/1944 | Herron | 126/43 |
| 3,025,848 | 3/1962 | Malgesini | 126/25 C |

FOREIGN PATENT DOCUMENTS

| 1062055 | 7/1959 | Fed. Rep. of Germany | 126/25 C |
| 29461 | 2/1907 | Switzerland | 126/43 |
| 693273 | 6/1953 | United Kingdom | 126/25 C |

Primary Examiner—Carroll B. Dority, Jr.
Assistant Examiner—Lee E. Barrett
Attorney, Agent, or Firm—Charles E. Brown

[57] ABSTRACT

A burner device, especially for a so-called brazier or the like, comprising a housing, an upper portion provided for the housing and equipped with at least one flame opening and separate air infeed openings. A regulation element, particularly in the form of a regulation slide serves for the regulation of the air infeed and a cover forming a flame extinguishing device is provided for the flame opening. According to the invention, the regulation slide and the cover for the flame opening are constituted by a common element.

3 Claims, 3 Drawing Figures

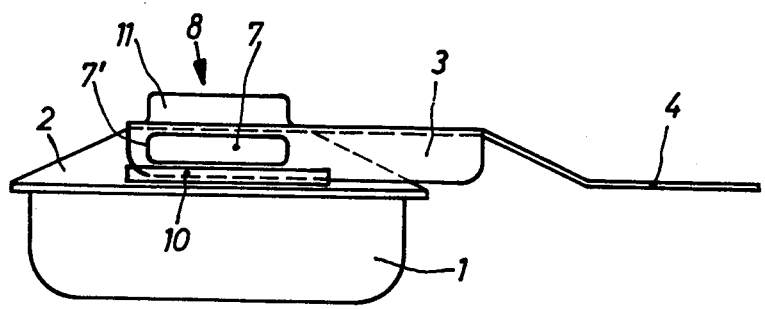
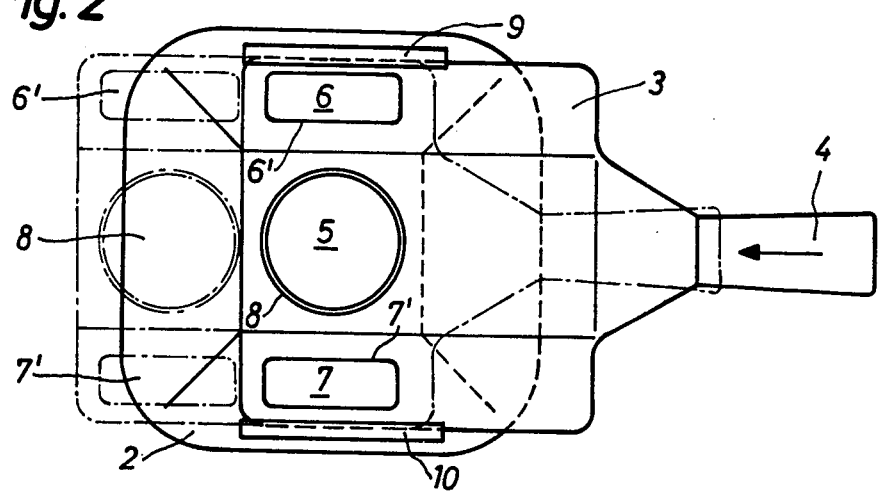
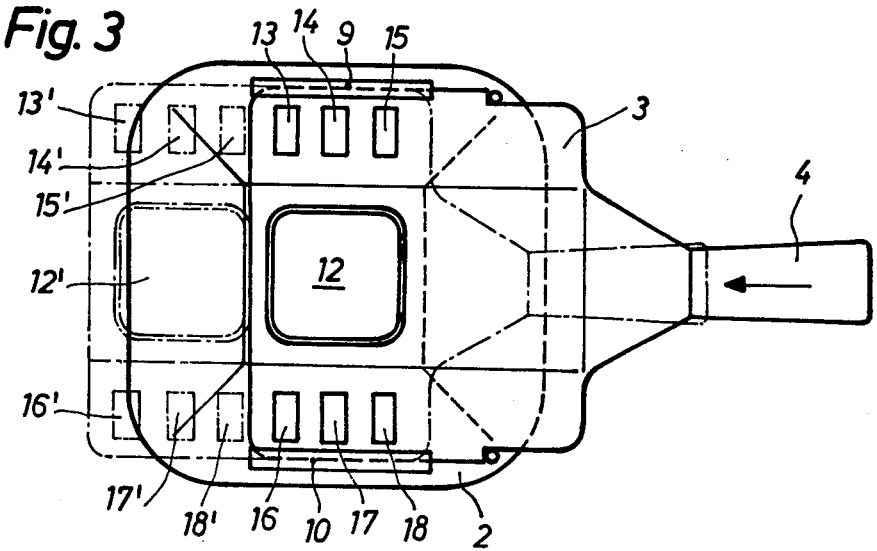

ical purposes, which comprises a housing 1 provided with an upper part or portion 2 as well as a slide 3 having a handgrip 4. The slide 3 forms a regulation slide and at the same time a cover or cover member for the flame opening 5. The housing 1 serves to receive therein a

BURNER DEVICE, ESPECIALLY FOR A BRAZIER OR THE LIKE

BACKGROUND OF THE INVENTION

The present invention relates to a new and improved construction of a burner device, especially a burner for so-called braziers and other small cooking utensils or stoves, as the same are employed typically as household devices.

Heretofore known burner units of this type, which are usually operated with methylated spirits or similar or other appropriate fuels, are well known at the present time as safety burners. They usually consist of a housing for the reception of the fuel, an upper portion having at least one flame opening and separate air infeed openings for the combustion air, a regulation slide for regulating the combustion air infeed and a cover for the flame opening. This cover simultaneously serves as an extinguishing element or extinguishing device for the flame.

As a general rule such type burners have found acceptance in practice. Yet, one drawback associated therewith is that frequently the flame extinguishing device is misplaced, so that when it is needed it is not available. Thus, in an attempt to extinguish the flames oftentimes the user of the burner device carries out unworkable and hazardous attempts to extinguish the flames, for instance tries to extinguish the flames by blowing them out. Not only is this technique ineffectual, but equally hazardous.

SUMMARY OF THE INVENTION

Therefore, with the foregoing in mind it is a primary object of the present invention to provide a new and improved construction of burner unit which is not associated with the aforementioned drawbacks and limitations of the prior art proposals discussed above.

Still a further significant object of the present invention aims at providing a new and improved construction of burner of the aforementioned type which does not exhibit the previously discussed shortcomings, however is no more complicated and expensive in its construction, nor is the fabrication thereof more expensive than the conventional burners.

Yet a further significant object of the present invention is to provide a burner device of the mentioned type wherein there is no danger of misplacing the flame extinguishing element, so that the flame can be extinguished at all times by such flame extinguishing element, and the latter apart from having a flame extinguishing function carries out a flame regulation function by controlling the air infeed to the burner.

Now in order to implement these and still further objects of the invention, which will become more readily apparent as the description proceeds, the burner device or burner of the present development is manifested by the features that there is provided a housing, an upper portion for the housing, the upper portion having at least one flame opening and separate air infeed openings. A movable regulation element, specifically in the form of a regulation slide serves to regulate the air infeed and a cover for the flame opening constitutes a flame extinguishing device. According to important aspects of the invention the regulation or regulating slide and the cover for the flame opening are formed as a common or integral element. Stated in another way, this common element has the regulation slide and cover formed of one-piece, or, even a number of pieces united into an integral component. Hence, in the context of this disclosure the term "common element" is to be understood as encompassing these various possibilities and equivalents thereof.

The construction proposed by the invention has the advantage that the heretofore conventionally employed regulation slide, when assuming a certain position, covers both the flame opening and also the air infeed openings and therefore in such position simultaneously constitutes the cover which heretofore was constructed as a separate component. Since this novel slide element is guided at the upper part or portion of the burner and basically is fixedly attached, it is no longer possible for the extinguishing device to become misplaced or lost. Additionally, when providing a particularly unique arrangement of the air infeed openings there is also obtained the beneficial result that a certain surface or area of the air infeed openings also corresponds to a corresponding surface or size of the flame opening. In this way there is obtained optimum combustion.

The common element forming the regulation slide and the cover advantageously consists of a slide having a handle. This handle equipped-regulation slide is displaceably guided at the upper portion of the housing in rail-like guides or tracks. Of course, this slide is equipped with openings which advantageously as to their size and arrangement correspond to the related openings at the upper portion of the burner. In this way it is possible to completely maintain all of the air infeed openings and the flame opening in an open state in one position of the regulation slide, whereas in another position thereof all of the openings are closed.

Normally the flame opening is disposed approximately at the center of the burner and the corresponding cooperating opening also at the center of the slide, whereas to both sides of such opening there are provided a number of air infeed openings or ports. The shape of the flame opening and also the air infeed openings can be randomly chosen.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic side view of a burner device or burner constructed according to the teachings of the present invention;

FIG. 2 is a top plan view of the burner device shown in FIG. 1, wherein in full lines there has been shown the complete opened position, whereas the phantom lines show the closed position of the slide which forms the cover and the regulation device; and FIG. 3 is a top plan view of a variant embodiment of burner from that shown in FIGS. 1 and 2.

DETAILED DESCRIPTION OF THE PREFERRED EMBODIMENTS

Describing now the drawings, in FIG. 1 there is illustrated a burner device or burner for typical cooking suitable fuel, for instance methylated spirits in a liquid or pasty-like form. At the center of the upper portion 2 there is provided the flame opening 5 and to both sides thereof a respective elongate air infeed opening 6 and 7. Such are conventional elements found at prior art burners, with the exception of the construction here contemplated, namely designing the regulation slide so that at the same time it also serves as the cover for the flame opening 5.

In this regulation element, namely the slide 3 there is arranged an opening 8 essentially corresponding to the flame opening 5 and also laterally thereof there are provided the openings or ports 6' and 7' corresponding to the air infeed openings 6 and 7. The regulation or regulating slide is displaceably guided in two lateral guides or tracks 9 and 10. With the aid of any suitable stops (not particularly shown in FIGS. 1 and 2), such as for instance impact elements, it is possible to fix or determine two end positions of such slide 3. One of such end positions of the regulation slide 3 has been shown in full lines in FIGS. 1 and 2. This position portrays the burner device in its maximum burner position, in other words the flame opening 5 and the air infeed openings 6 and 7 are completely open. The phantom line position shown in FIG. 2 illustrates the other end position where the slide 3 functions as a cover or cover member, and thus, completely closes such flame opening 5 and the air infeed openings 6 and 7 of the upper portion 2. The opening 8 in the slide 3, which is matched to the flame opening 5, is further equipped with a conventional flue-like projection or mounting 11.

Continuing, in FIG. 3 there is shown a variant embodiment of the burner device of FIGS. 1 and 2, and the same in principle only essentially differs therefrom in that here the flame opening 12 does not have an essentially circular-shaped configuration like the flame opening 5 of the arrangement of FIGS. 1 and 2, rather possesses a quadratic, such as a square cross-sectional configuration, and furthermore, laterally of such configured flame opening 12 there are provided to each side three air infeed openings 13, 14, 15 and 16, 17 and 18 respectively. Openings corresponding or matched to these openings are also arranged in the regulation element, namely the regulating or regulation slide 3, and specifically there will be seen a flame opening 12' and air infeed openings 13',14', 15',16', 17' and 18'. The embodiment shown in FIG. 3 allows for a more precise regulation of the flame.

While there are shown and described present preferred embodiments of the invention, it is to be distinctly understood that the invention is not limited thereto, but may be otherwise variously embodied and practiced within the scope of the following claims. Accordingly,

What is claimed is:

1. A burner device, especially for a brazier or other small cooking stove or the like, comprising:
   a housing;
   an upper portion provided for said housing;
   said upper portion having at least one flame opening and separate air infeed openings;
   a regulation slide for regulating the air infeed;
   a cover for the flame opening and forming a flame extinguishing device;
   said regulation slide and cover comprising a one-piece common element,
   said regulation slide and said cover being in the form of slide means provided with a handgrip; and
   guide means on said upper portion for guiding said slide means,
   said common element being provided with openings which in size and arrangement essentially correspond to the openings provided at the upper portion,
   said separate air infeed openings at the upper portion including a plurality of respective air infeed openings arranged at opposite sides of the flame opening.

2. The burner device as defined in claim 1, wherein the flame opening is of substantially circular-shaped configuration.

3. The burner device as defined in claim 1, wherein said flame opening is of substantially quadratic configuration.

* * * * *